Oct. 31, 1950            C. H. HELM            2,528,308
REFLECTOR CAMERA HAVING FILM FEEDING MEANS
AND SPHERICAL FILM SUPPORT
Filed Aug. 10, 1946
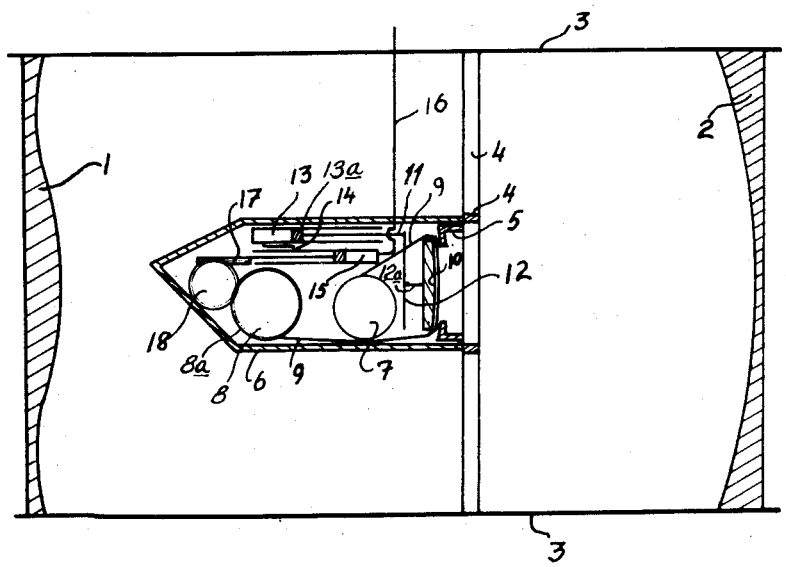
INVENTOR
CARL HENRIK HELM
by: John Graham
HIS AGENT.

Patented Oct. 31, 1950

2,528,308

UNITED STATES PATENT OFFICE 2,528,308

REFLECTOR CAMERA HAVING FILM FEEDING MEANS AND SPHERICAL FILM SUPPORT

Carl Henrik Helm, Copenhagen, Denmark

Application August 10, 1946, Serial No. 689,756
In Denmark September 17, 1942

Section 1, Public Law 690, August 8, 1946
Patent expires September 17, 1962

3 Claims. (Cl. 95—11)

The present invention relates to reflector cameras, namely, cameras in which the formation of the picture is obtained by means of a concave mirror. It is commonly known that spherical mirrors cannot form suitable pictures because of spherical aberration, whereas on the other hand parabolic concave mirrors have the disadvantage that the prefect picture production obtainable by means of such mirrors as regards light rays issuing from a distant point on their axis, is not obtainable for points remote from their axis. In cases where it is desired to cover a fairly wide field it has been necessary to employ a so-called Schmidt-camera, in which the reflector is spherical and in which there is arranged in front of the reflector, at a distance corresponding to the radius of the mirror, a correction plate to neutralize spherical aberration. Schmidt-cameras have been extensively used for astronomical purposes, since their use enables an extensive picture field to be combined with an aperture of an unusual size, for instance f/1 or even more. For this reason they are adapted for photographing comparatively large, but poorly lighted objects.

It will be apparent that the picture in a Schmidt-camera must be formed on a spherical surface that is disposed concentrically to the reflector and having approximately half the curvature radius of the latter. In view of the above mentioned fact that Schmidt-cameras are preferably employed in cases where exceedingly large aperture conditions are required, it is necessary for the sensitive material to be accurately positioned in relation to the surfaces within which the picture is to be found. For this reason it has been necessary to arrange either for the sensitized film to conform closely to the picture curvatures or for the picture to be recorded on a glass plate in front of which there is placed a lens for compensating the curvature of the picture field.

The spherical aberration introduced by the lens must be taken into consideration in calculating the correction plate, in which case the field will be free from spherical aberration, but not entirely free from chromatic aberation, which is otherwise entirely avoided in reflector cameras. The Schmidt-camera with a lens for compensating the curvature of the picture field possesses, however, the advantage, that there is employed a sensitive plate, the placing of which, in the plane in which the picture is formed, can be accurately obtained.

However, Schmidt-cameras, without compensation for curvature of the picture field have hitherto been more common.

In such cameras it is not possible to use thin films because of their tendency to pucker up or wrinkle when applied to a spherical surface (see H. A. Lower: "Notes on the Construction of a P. H. Schmidt-Camera" in "Amateur Telescope Making Advanced," page 415). Instead a heavier film has been employed cut to circular form and applied to a spherical polished surface by means of a ring attached to the edge of the surface (see H. W. Cox and L. A. Cox in "The Journal of the Britsh Astr. Ass.," vol. 48, page 308, and vol. 50, page 61). Each camera is provided with several film supports, thus rendering possible several exposures in succession by exchanging the support carrying the exposed films with a support to which an unexposed film has previously been applied.

This method of carrying sensitive material is not, however, convenient for taking a series of exposures, if for instance the reflector camera is to be used for mass-radiography, because the storage of films in the shape of circular pieces, their application to the film carrier, and the exchanging of the film carrier in the apparatus is troublesome and involves the use of a darkroom.

Accordingly, it is an object of the present invention to provide novel and useful improvements in reflector cameras of the type described, whereby the film utilized may be in conventional roll form, and yet the portion to be exposed will be so curved at the time of exposure as to compensate for the curvature of the field.

It is another object of the invention to so arrange the film utilized in a reflector camera of the type referred to that it will be automatically curved at the time of exposure to compensate for curvature of the field without wrinkling or puckering the film.

According to the present invention there is provided a reflector camera using standard roll films as the sensitized material and having an apertured picture frame and a film support provided with a spherical surface between which the film is passed for guiding the film, so that after each exposure the film can be shifted whereby an unexposed portion of the film appears within the picture aperture in the frame, the film guiding device also being provided with means for periodically pressing the frame and the support together and releasing this pressure during the shifting of the film.

By means of the apparatus of this invention, it is possible to employ an ordinary sensitized roll film, for instance a cinematographic roll film, in conjunction with a reflector camera provided with a curved picture field. In practicing the present invention the film support surface includes a portion of a spherical surface having the desired curvature, and the picture frame is so formed that it presses the film into contact with the spherical surface along a line completely encompassing the picture field when pressure is applied.

In order to avoid the formation of wrinkles or puckering of the film within the actual picture field or area it has been found desirable that the compression of the frame and the support should only take place along an outline or border that surrounds the picture field, and that this border should be relatively narrow with respect to the size of the picture area. Usually it is difficult in the case of thin film to avoid the formation of wrinkles, but it has been found that when the apparatus herein described is utilized, these wrinkles will only occur outside the picture field and as soon as the pressure is released the film is again completely straightened out.

A narrow compression edge or border as mentioned above may either be formed by the picture frame being provided with a very narrow edge facing the film, in which case the film support must have a periphery that at least corresponds to the periphery of the exterior edge of the picture frame, or by the picture frame being compartively wide, and the film support being only so large that it slightly overlaps the edge of the aperture in the picture frame.

Preferably the pressure applying means and the film feeding mechanism are automatically interconnected and these may be interconnected to the exposure mechanism if so desired. To this end the actuating members of the film shifting mechanism, on the termination of the film feeding movement, may bring about operation of pressure means for causing the film support and the picture frame to move relative to one another for attaining the desired compression or film contact. This compression may, however, be effected independently of the film shifting, in which instance the compression means may be actuated by a handle attached to a rotatable or displaceable rod that extends through the camera wall and is connected to the mechanism within the camera.

The film feeding or shifting mechanism as well as the mechanism for compression of the picture frame and the film support may be operated by compressed air or other pressure medium, which may be arranged, upon opening of a valve at the termination of the film shifting, to actuate the mechanism producing the compression.

To obtain a well defined position of the sensitive coating or emulsion of the film it is necessary that the picture frame be kept in a fixed position during the compression actuation in cases where the emulsion side of the film faces forward, but if the other side of the film faces forward the film support must be kept in a fixed position during the compression.

In a preferred construction, the picture frame is rigidly mounted within the camera, and the film support is movable relatively thereto being moved towards and away from the picture frame under pressure. The frame and support are carried in a unit or frame together with the roll film holders and feeding mechanism therefor, thus providing a complete assembly that may be removed from the camera for changing the film.

My invention will now be described with reference to the accompanying drawing which illustrates one embodiment thereof and the manner in which my invention is carried out, and it will be understood that while I have described what may be considered as a preferable embodiment of my invention I do not limit myself to the precise conditions or proportions herein set forth as they may be varied by those skilled in the art in accordance with the particular purposes for which they are intended and the conditions under which they are to be utilized.

The drawing shown is a section through the axis and parallel to one of the side lines of the picture, viz. the side line parallel to the borders of the film, of a Schmidt camera incorporating the novel and useful improvements in accordance with the present invention. The housing 3 of the camera is shaped like a cylindrical tube having in its wall an opening (not shown in the drawing) with a tightly fitting cover, which opening is of sufficient size to permit the unit comprising the film rolls, the film support and the means for moving the film and support, to be inserted and withdrawn through it.

A reflector 2 is provided which may be made in the usual manner by grinding and polishing a plate of glass or other similar material so that one of its surfaces takes a spherical form and metallizing for example, said spherical surface. The mirror 2 is fastened into the housing by means (not shown) permitting the mirror to be adjusted so that it is positioned exactly perpendicular to the axis of the cylindrical housing and so that after mounting there remains no undue strains in the material of the mirror since such strains would tend to warp the spherical surface out of its exact form.

Correction plate I is the usual Schmidt-plate made by grinding and polishing glass, preferably quartz glass or other similar transparent material, to an exactly defined shape by which it will correct the spherical aberration of the mirror 2. The Schmidt-plate I is also mounted in the tubular housing 3 by means of screws or the like (not shown) permitting its position to be adjusted with the necessary exactness. The adjustment means are not shown in the drawing, as they may be made in a quite customary manner. The Schmidt-plate is formed with an aspherical surface which preferably is turned towards the mirror 2, the other surface being a plane or very slightly spherical surface which is then turned towards the object. The Schmidt-plate is placed in a distance from mirror 2 corresponding to the radius of curvature of the mirror.

At a short distance nearer to the mirror 2 than the focal distance there is placed a system of spiders 4 carrying a picture frame 5. Two of the spiders 4 in the embodiment shown are vertical and two of them are horizontal. They are in the shape of bands or struts fastened to the inner surface of the tubular housing 3 and intersecting each other. Each of the struts have their narrow edges turned towards the mirror 2 in order that they may obstruct as little of the incident light as possible.

The picture frame 5 is generally a square frame of angular cross-section. It is soldered to the spiders 4 and the part of it facing the correction plate I has a surface which is ground exactly spherically. The inside edges of the frame correspond exactly to the picture size selected.

To the outside of the picture frame a box 6 is fitting exactly so that it can be placed in the position shown in the drawing or removed therefrom. In order to keep it in the position shown the picture frame or the spiders 4 may be provided with suitable locking means (not shown in the drawing).

In the box 6 are placed roll film holders or rollers 7 and 8, a film support 10, two pneumatic cylinders 13 and 14 and means for moving the film rollers and film support. In the sides of the box 6 are openings (not shown in the drawing) and closed by suitable covers through which the film rollers 7 and 8 can be inserted or withdrawn and the film 9 placed in its active position as shown in the drawing. The film roller 8 is mounted on its shaft so that it follows movements thereof, and on the shaft there is placed also a gear wheel 8a engaging another gear wheel 18 which in turn engages a toothed rack on the piston rod 17. The piston rod 17 is connected with a piston of the cylinder 15 the bottom of which is connected with a pipe or tube 16 that extends through the camera wall and is so long and flexible that it permits the box 6 to be withdrawn from the camera housing 3 for inserting new film on rollers 7 and 8. The tube 16 communicates in a manner not shown with a source of compressed air or the like actuating means. The piston operating in the cylinder 15 when forced outwardly operates the gear wheel 18 which engages the gear wheel 8a fixed upon the shaft of the roller 8 thus winding up a suitable piece of film upon said roller of predetermined length, to expose a new area of unused film on film support 10. The source of supply of film is on roller 7 which is caused to rotate to pay off film when said roller 8 is rotated by piston 15

In the cylindrical wall of the cylinder 15 there is a hole or a port 14 at a suitable distance from the bottom of the cylinder 15. This port 14 communicates with the lower end of another cylinder 13 having a piston 13a movable therein. The piston rod of piston 13a is attached by means of a linkage 11 to a lever 12 pivotally supported in its lower end and connected to the film support 10 by a link 12a. By means of springs (not shown) each piston is pressed lightly against the bottom of its respective cylinder 13 or 14. Co-operating with the gear wheel 18 or in the connection between the gear wheel 8a on the shaft of the film roller 8 and the said shaft, there is arranged a ratchet (not shown) permitting the piston rod 17 to be moved towards the bottom of the cylinder 15 without turning the film roller 8.

The apparatus operates in the following manner:

Pressure set up by the compressed air supply in cylinder 15 will cause displacement of the piston rod 17 and thus a feeding movement of the film roller 8. When the piston attached to the rod 17 has moved so far that the pressure of air in cylinder 15 is released through the hole 14, the feeding movement of the film is arrested, but the piston in the cylinder 13, due to the transfer of pressure thereto, will be displaced in an outward direction to effect a movement of the film support 10 against the picture frame 5 through linkage 11, 12 and 12a. By means of the springs mentioned above the pistons are restored to their initial positions when the pressure supply is cut off.

The film 9 from the film roller 7 is carried over the film support 10 to the film roller 8, and the portion of film on support 10 is firmly held thereagainst by such pressure during exposure, being held between gate 5 and support 10 at the peripheral edges of the film.

The surface of the film support 10 facing the picture frame 5 is exactly spherical and has the same curvature as the image field. The spherical peripheral edges of the picture frame 5 have this same curvature and the frame is located exactly on the surface of the support at the area where the image is formed thereon by the mirror 2. Thus when the film is pressed forward by means of the piston of the cylinder 13 so that the border of the part thereof resting upon the front surface of the film support 10 is pressed against the picture frame 5, the film lies exactly in the image surface. In order to ensure a perfect image, however, the correcting plate 1 and the mirror 2 must have adjusting means to bring them in exact adjustment with the picture frame 5 supported by the spider 4.

To facilitate such adjustment the spiders 4 or the picture frame 5 may also have adjustment means.

If a great number of pictures are to be taken in a short time, it may be preferable to place the film rollers 7 and 8 outside the camera housing 3 and then arranging a channel through which the film is guided from the roller 7 to the film support 10 inside the camera and back to roller 8. When the film rollers are placed outside the camera the film length may be greater than when placed inside the box 6. In this case the film feeding means may also be placed outside the camera, but, of course, the means for moving the film support 10 relative to the frame 5 must always be placed inside the camera.

Instead of moving the film support 10 this may be held stationary and movement may be imparted to the picture frame 5 in a similar way to that given above, it only being necessary to impart relative movement under pressure urge to support 10 and frame 5 in order to correctly align the film to be exposed in the image field.

The correcting plate 1 in the case when it is made from quartz or similar glass will admit ultra violet rays, which in certain cases will permit a shorter exposure. On the other hand, the material from which the correcting plate is made must always be a transparent and light refracting material and the curvature of the aspherical surface thereof must be calcaulated in accordance with the refracting index of the material.

What I claim is:

1. A reflector camera comprising a correction plate having an aspherical surface adapted to correct spherical aberration, a concave spherical mirror, the concave surface of which faces said correction plate, a film feeding device for feeding successive portions of film to the exposure position, a film support placed between said correction plate and mirror and provided with a convex spherical supporting surface facing said mirror, an open picture frame having a corresponding concave surface adapted to abut a narrow border portion only of said supporting surface and smoothly constraining the film against the convex supporting surface, and means for causing relative compression of said picture frame and said film support.

2. A reflector camera comprising a correction plate having an aspherical surface adapted to correct spherical aberration, a concave spherical mirror, the concave surface of which faces said correction plate, a film feeding device for feeding successive portions of film to the exposure position, a film support placed between said correction plate and mirror and provided with a convex spherical supporting surface facing said mirror, a picture frame the contacting surface of which constitutes a part of a concave spherical surface having the same curvature as said supporting surface and which limits an aperture which is smaller than said supporting surface, thereby forming a retaining border around said picture of a width that is comparatively narrow in relation to the size of the picture, to smoothly constrain the film against the convex spherical supporting surface, and pressure means for periodically causing relative movement of said picture frame and said film support toward each other to cause intimate contact of a portion of film to be exposed and said supporting surface, said pressure means being released prior to operation of said film feeding device.

3. A reflector camera comprising a correction plate having an aspherical surface adapted to correct spherical aberrations, a concave spherical mirror, the concave surface of which faces said correction plate, a film support placed between said correction plate and mirror and provided with a convex spherical supporting surface facing said mirror, a film feeding device for feeding portions of film to overlie said supporting surface, a picture frame within said camera, the contacting surface of which constitutes a part of a concave spherical surface having the same curvature as said supporting surface to define an aperture which is smaller than said supporting surface thereby forming a retaining border around said picture of a width that is comparatively narrow in relation to the size of the picture for constraining the film against said convex spherical supporting surface, said support being movable for establishing pressure between said film and said picture frame.

CARL HENRIK HELM.

REFERENCES CITED

The following references are of record in the file of this patent:

UNITED STATES PATENTS

| Number | Name | Date |
| --- | --- | --- |
| 1,082,678 | Casler | Dec. 30, 1913 |
| 1,224,304 | King | May 1, 1917 |
| 1,927,887 | Cresfrinel | Sept. 26, 1933 |
| 2,036,428 | Mihalyi | Apr. 7, 1936 |
| 2,049,041 | Berggren | July 28, 1936 |
| 2,282,869 | Johnson et al. | May 12, 1942 |
| 2,295,802 | Nicoll | Sept. 15, 1942 |
| 2,403,660 | Hayward | July 9, 1946 |